United States Patent Office 3,323,499
Patented June 6, 1967

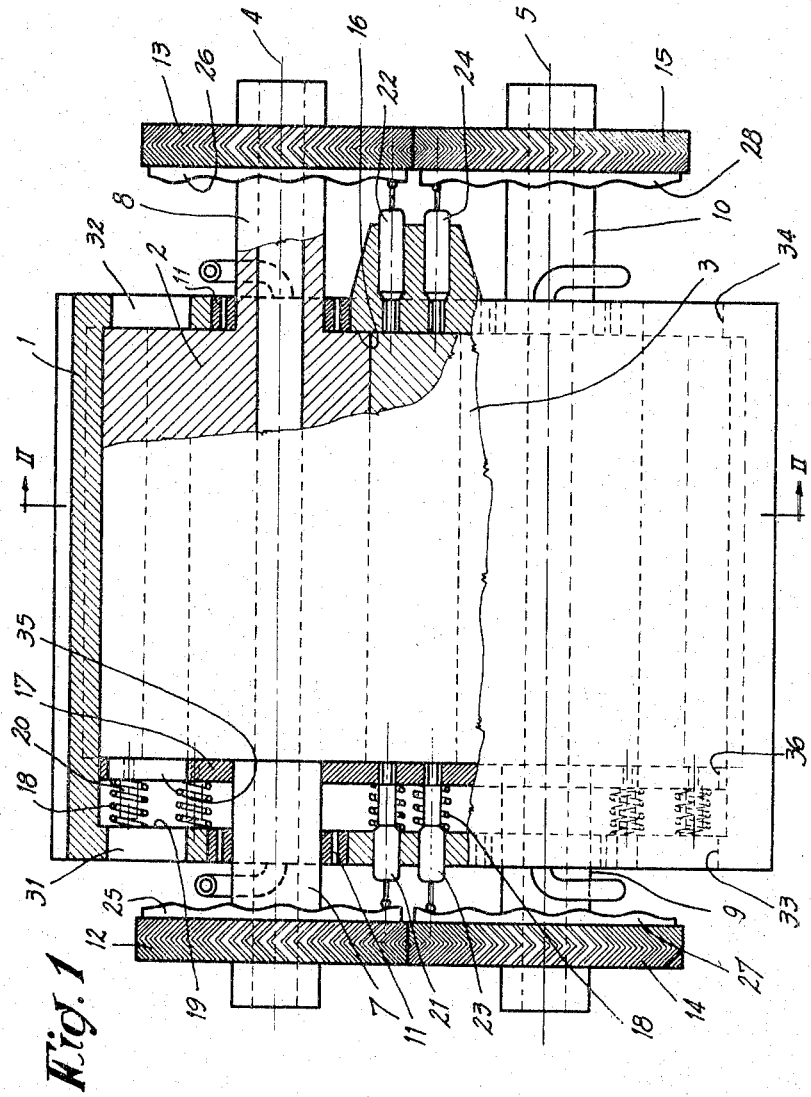

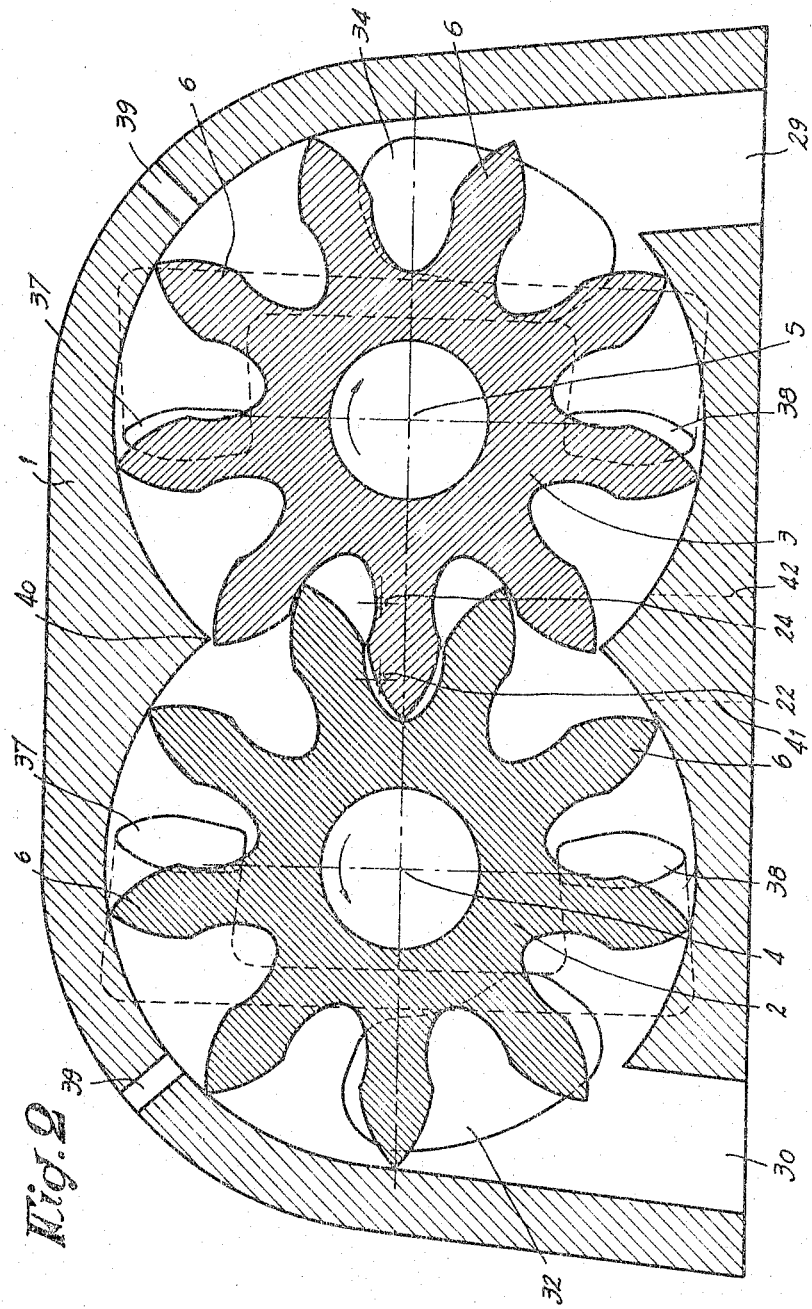

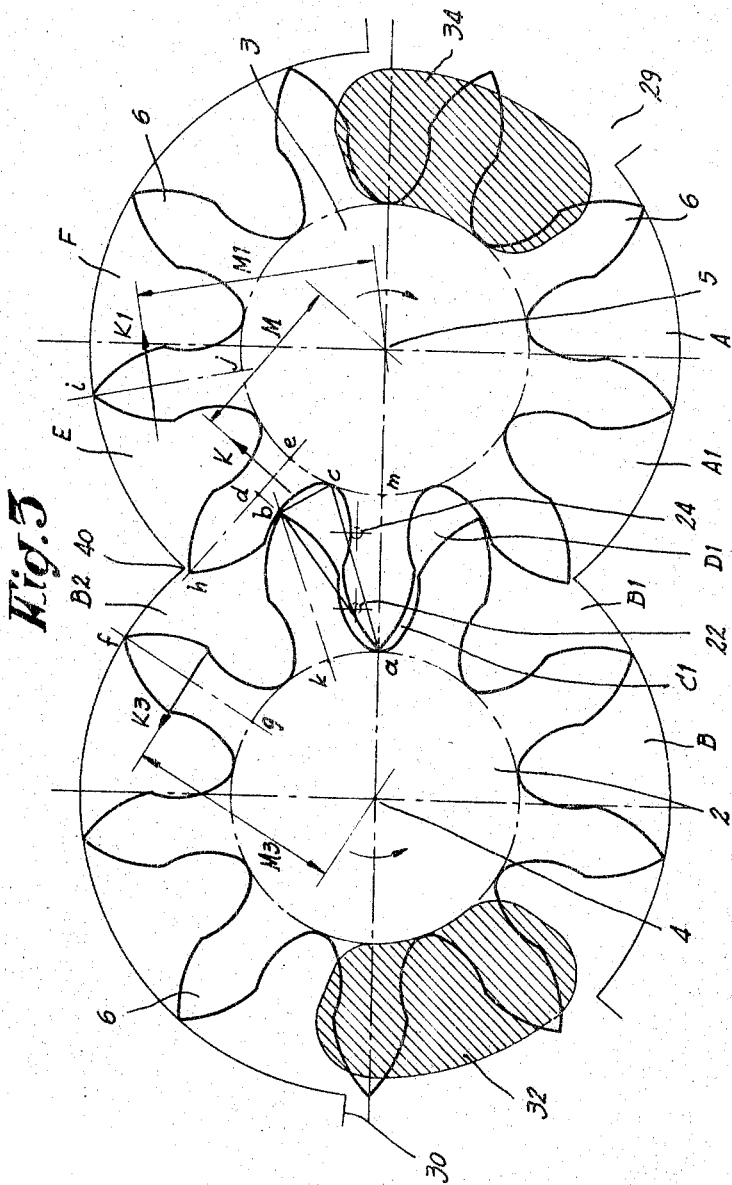

3,323,499
ROTARY COMBUSTION, RESPECTIVELY
EXPANSION ENGINE
Peter Hendrik Gijbels, Square Fr. Riga 1, Schaarbeek,
Brussels, Belgium
Filed June 25, 1964, Ser. No. 377,823
Claims priority, application Belgium, July 1, 1963,
634,333
7 Claims. (Cl. 123—12)

It is well known that in combustion engines use is made of the energy of a source of heat, this energy being converted by means of a crank and connecting rod mechanism into a rotary motion.

Aforesaid crank and connecing rod mechanism has many inconveniences which adversely influence the efficiency and the smooth running of these engines. It is mainly for this reason that suggestions have frequently been put forward for rotary combustion engines, without however so far having been able to reach a satisfactory solution.

The present invention has as object a rotary combustion or expansion engine which systematically eliminates the inconveniences of the solutions suggested so far for such engines, and presents a rational design for such a type of engine.

The main advantages of the engine according to the present invention are:

(a) High mechanical efficiency, because there are practically no frictional parts;
(b) A sturdy engine with great operating safety, due to its extremely simple construction;
(c) Low maintenance, as all wear is limited to the external gears and the terminal surfaces of the rotors;
(d) Carbonization due to bad combustion contributes to the improvement of the sealing;
(e) Recuperation of lost heat and compression energy out of the exhaust gases;
(f) Due to the great number of combustions per engine revolution, no flywheel is required;
(g) Practically noiseless engine, due to the fact that the gases expand in five steps before escaping;
(h) The rotary action of the engine automatically rejects eventual impurities, thus preventing damage;
(i) No oscillating parts;
(j) Quantitative adjustment of speed and power by means of one, two, three or four injectors;
(k) possibility of supercharging;
(l) Small engine with great power and very strong torque, hence an engine with small mass weight, i.e. with little weight per H.P.

The engine possessing the abovementioned advantages consists mainly of the combination of an engine case with two rotors, provided along their circumference with mutually engaged teeth; the shafts of these rotors, outside the engine case, are provided with gears which are also mutually engaged, so as to be able to take up the forces acting upon the rotors; in relation to each rotor, at least one induction and one exhaust cavity, and at least at one side of the engine at least one injector which injects the fuel at the appropriate instant into the chambers formed between the teeth.

In order to show the characteristics of the invention more clearly, a preferred embodiment has been described below with reference to the appended drawings in which:

FIGURE 1 is a partial sectional top view of an engine according to the present invention;

FIGURE 2 is a larger scale cross section of the engine according to line II—II of FIGURE 1;

FIGURE 3 shows the rotors for the purpose of describing the operation of the engine.

In this form of embodiment, the engine according to the present invention consists mainly of an engine case 1 in which two rotors, respectively 2–3, are fitted in bearings. These rotors rotate around center line 4–5 and are fitted along their circumference and over their entire length with a set of teeth 6 of particular shape, in the present case nine per rotor, which are mutually engaged.

The extremities of aforesaid teeth 6 must fit very precisely against the cylindrical walls of the engine case, so as to constitute properly sealed chambers between each two teeth. Other appropriate sealing may possibly be provided for.

Towards both extremities of the rotors, stub shafts 7–8 and 9–10 are fitted in needle bearings, schematically shown as 11, both the stub shafts and the rotors themselves being of hollow construction, so as to make possible some appropriate artificial cooling. According to the thermal load of the rotor teeth, the latter may also be provided with cooling cavities which communicate with the hollow shafts. On aforementioned stub shafts 7 to 10, gears, respectively 12–13 and 14–15, which are in mutual engagement have been fitted, with the object of taking up the forces acting upon rotors 2–3, so as to prevent the wear of the rotors and of teeth 6 respectively.

The end surfaces of rotors 2–3 fit at one end against side wall 16 of the engine case and at the other end against a sealing element 17 which is pressed away from engine side wall 19 and against the rotors by means of strong springs, schematically represented by 18, these springs being for instance held in place by means of guide pins fitted in aforesaid element 17. It is quite obvious that both the end surfaces of rotors 2–3 and the corresponding walls of the engine case and of the sealing element must have a perfectly machined finish.

In side walls 16 and 19, and respectively in sealing element 17, injectors 21–22 and 23–24 have been provided at predetermined locations, driven by cams 25–26 and 27–28 provided upon aforesaid gears 12 to 15. In order to prevent axial pressures upon shafts 7 to 10, and respectively on rotors 2–3, gears 12 to 15 will preferably be provided with straight or V-shaped gear teeth. Finally, each rotor communicates on the one hand with an exhaust port, respectively 29 and 30, which extends across a well determined arc of a circle, and on the other hand with two air inlets, respectively 31–32 and 33–34, provided in side walls 16 and 19. It is quite evident that sealing element 17 is provided with openings 35 and 36 corresponding to the air inlet ports of the side wall.

It is quite obvious that the engine, particularly in the case of low power models, can be built with protruding shafts with gears, and respectively injectors and inlet ports, in one of the side walls 16 or 19 only.

Finally openings 37 and 38 have been provided respectively in side walls 16 and 19 of the engine, openings 37 being connected by means of a pipe or conduit (not shown) to openings 38.

As last refinement, the engine case may still be provided with holes 39 which can be connected up by means of a conduit to some turbine or similar device so as to permit the utilisation to the utmost of the pressure of the not yet completely used up gases.

It is also quite evident that the power output can be collected from any one of the shafts 7 to 10. The power output can also be taken from both shafts.

In the selected example, the height of the teeth is equal to one half of the radius of the rotors, this dimension being determined by the torque required from the engine, whilst the length of the rotors depends upon the operating pressure of the fuel injectors.

The base of teeth 6 has been designed according to the cyclodial curve described by the tooth tips. In consequence it is these tooth tips or summits which assure the sealing between the cylindrical wall of engine case 1 and the chambers formed between teeth 6. This calls for a mechanical construction of high precision which assures that the maximum sealing effect is reached when the engine is at operating temperature.

Normally, i.e. when liquid fuel is being used, the engine will effect twice as many combustions per revolution as there are teeth on each rotor, provided each rotor is equipped with at least one injector.

The operation of the engine according to the present invention is extremely simple and as described below.

The engine is started by means a special starting device making use for instance of some starting glow or spark plugs (not shown). When the engine has reached operating temperature, no more artificial ignition is required, as the combination temperature of fuel oil is easily surpassed.

In order to properly understand the operation of the engine, the physical principles thereof will first be more completely expounded.

When rotating rotors 2–3 by hand, in the indicated sense, the air in chambers A1–B1 and C1–D1 will be compressed, giving rise to a resisting torque. When, after a rotation of some 20°, the chambers have reached their highest pressure and the rotors are released, the resisting torque of the compressed air will turn the rotor back. If however the rotors are not released, but turned further, the air enclosed in the chambers will be able to expand above line 4–5, supplying a torque which helps the rotation of the rotors. The stored up energy of the compression is released above line 4–5 and the further rotation of the rotors hardly requires any complementary work, as the energy required for compressing below line 4–5 is supplied by the expansion above line 4–5. The driving torques are consequently located above line 4–5 whilst the resisting torques of the compression are located under it. If fuel is now injected via 21, 22, 23 and 24 into the chambers passing in rotation, a highly heated gas at very high pressure will be formed at that location, thus increasing the driving torques to a very great extent.

Let us consider two chambers in particular, for instance A and B. They are completely filled with air and are moving towards each other, in order finally to merge together. As this combined chamber becomes smaller, the pressure rises. For the air contained in this chamber with reducing volume there is but one way to escape, and that is in between and in the sense of motion of the teeth. The tooth tips however act as effective seals, so that a very high pressure is reached in the reduced chambers between the teeth. As the combustion always takes place behind the teeth, considered in the sense of rotation, fuel injection will occur first at injectors 23–24 and next at injectors 21–22 in the corresponding chambers. Due to the high temperature, the fuel will automatically ignite, whereupon the expansion of the gases will follow. The gases are evacuated in the chambers formed between the teeth and escape through the exhaust openings 29–30. Whilst fresh air is already being introduced at the base of the tooth under slight pressure, due to the particular shape of induction ports 31–32–33–34, the residual gases are evacuated by centrifugal force. This results in a good scavenging of the chambers as well as in a cooling down of teeth 6.

The very high temperature of the enclosed air is obtained by the fact that the latter is mixed with hot exhaust gases and remains a long time in contact with the highly heated teeth which have a large surface, and further, due to the compression between the teeth. The mechanical compression ratio is somewhere around 4 to 1 for the type with nine teeth per rotor.

Let us now consider the operative surface and the torques. Considered on its side surface, the combustion chamber can theoretically be reduced to a triangle $a$–$b$–$c$, of which sides $a$–$b$ and $a$–$c$ are equal, as the rotors have the same diameter and an equal number of teeth with the same length.

The forces acting upon the surface corresponding to sides $a$–$b$ and $a$–$c$ due to the combustion compensate each other through the external gears 12 to 15. It is the surface corresponding to side $b$–$c$ which plays the active part. At the time of the combustion this side $b$–$c$ is small, whilst the pressure will be very great. As the dimension of this side increases, the pressure will drop due to a first phase of expansion of the gases. As a consequence thereof a first strong torque is exerted by the gases. For the particular position of FIGURE 3, the projected surface is $d$–$e$, whereas force K multiplied by the arm of leverage M determines the moment of the torque.

When tooth tip $b$ leaves the tooth base which it has grazed, chamber $a$–$c$–$b$–$a$ comes into communciation with chamber B2. The second phase of expansion of gases takes place without any work being done. As $$\frac{PV}{T} = \frac{P1V1}{T1}$$

the temperature of the gases decreases far below that of teeth 6 and the highly heated teeth immediately surrender heat to the active gases. This means that there is a gain of work in the thermal diagram.

In the position of FIGURE 3, expansion is taking place in chamber $a$–$b$–$c$. The aforesaid pressure moment $K \times M$ acts upon the base of tooth $h$–$e$, whilst a low pressure moment, equal to $K1 \times M1$, acts upon the top of tooth $i$–$j$, until tooth $h$–$e$ passes point 40. Chamber E is then shut off and ceases to be active. The low pressure moment $K1 \times M1$ now acts upon the top of tooth $h$–$e$. Teeth $f$–$g$ and $b$–$k$ are now subjected to pressure forces which compensate each other. When the gases leave chamber $a$–$b$–$c$ to enter chamber B, the same pressure will exist in both chambers. Tooth $b$–$k$ has the same pressure on both sides and the pressures upon teeth $h$–$e$ and $a$–$m$ compensate each other. Consequently, a considerable low pressure moment, $K3 \times M3$, acts upon the entire height of tooth $f$–$g$. When the engine has turned about ten degrees further, the combustion in chamber C1 will take place, producing a high pressure moment upon the base of tooth $b$–$k$.

The low pressure moment $K3 \times M3$ diminishes for two reasons. First of all due to the reduction of the surface at the lower part of tooth $b$–$k$, which disturbs the equilibrium upon tooth $b$–$k$, and secondly due to the increase in volume of chamber B2 in consequence of which the pressure falls.

Whilst aforesaid pulsating moments drop to their lowest value, a new combustion takes place between the teeth, and so on eighteen times per revolution, so that the engine constantly produces a strong torque.

Speed regulation as well as power regulation can be carried out in a simple manner by respectively putting into operation or putting out of action one or more injectors and by adjusting their injection to minimum or maximum.

In order to increase the low mechanical compression ratio of the engine, use can be made of the exhaust gases. To this purpose the gases are allowed to escape through holes 37, in order to be able to add them to the newly enclosed fresh air through ports 38. This air contains $x$ gram of oxygen, which permits the injection of $y$ gram of fuel oil. The hot gases under pressure mix with the cold fresh air in two phases. This is the reason why ports 37 and 38 have not been located symmetrically with respect to the teeth.

Chamber F first supplied its highest pressure in chamber $A_1$ and filled the latter partially. The tooth which acts as slide closes port 38 towards chamber $A_1$ and next puts chamber F, with its lower pressure, in communication with chamber A. When the rotor has rotated five degrees further, chamber E will precipitate its highest pressure gas in addition into chamber A, before filling the next chamber at its lowest pressure.

Ports 37 and 38 must however be smaller than a tooth, in order to prevent chambers A and A₁ as well as E and F from being put into communication with each other.

In the work diagram the compression will therefore start at a much higher level.

Whilst the hot teeth continue yielding heat to the mixture, the compressions take place right up to the instant of injection. Consequently the compression curve runs steeper than the adiabatic curve.

The reclaimed exhaust gases contain thermal and pressure energy, and play an important and favourable part in the work diagram. They raise the compression ratio with ease above the value of sixteen to one.

The exhaust gases can also be utilized coming from ports 37 and/or 39 in order to make compressed air, feeding the latter into the engine through special openings provided in the cylindrical walls of the engine case for the purpose of applying pressure feed.

The fourth and fifth expansion phases thus take place in chamber F. The residual gases are then finally expelled via ports 29–30 and the air supply takes place.

The engine can eventually be supercharged with compressed air, thus permitting an increase of power output without modifying the dimensions.

As previously mentioned, the hot tooth tips assure the correct sealing when the engine is in operation. The engine having to be started cold, there are considerable losses in that condition, which diminish however as the temperature rises.

Imperfect sealing is not of great importance because:

(a) the leakage from chamber a–b–c towards chamber B₂ has a favourable influence upon the low pressure moments;

(b) the time during which leakage can occur is very short, and (c) an increase of engine power calls for an increase in diameter of the rotors, so that the losses, expressed in percent, diminish.

It must also be noted that compressed gas or air can also be used as source of power in which case the feed supply is effected through the openings normally provided for the injectors 21 to 24. Under such circumstances the normal air supply is eliminated, whereas discharge ports have to be provided at the location where chambers A and B come together. For instance the ports shown in dotted lines 41 and 42.

Yet another possibility would consist of a combustion engine, the exhaust gases of which would feed an expansion engine of similar type. In this manner the gas pressures can be utilised to the extreme limit.

According to the present invention, aforesaid mechanical injection system could also be replaced by a system with electronic control or even by some continuous pneumatic injection system.

The invention is by no means limited to the form of embodiment described above, but can be carried out in various forms and dimensions, whilst remaining within the scope of the invention.

What I claim is:

1. In a rotary combustion or expansion engine, an engine case, two rotors within said case, said rotors having interengaging epicycloidal teeth having sharp tips engaging inner walls of said case, the bases of said teeth being of corresponding epicycloidal shape, shafts carrying said rotors and extending outside of said case, intermeshing gears carried by said shafts and located outside of said case, said case having at least one air inlet and at least one exhaust port for each rotor, and at least one fuel injector extending into said case for injecting fuel between two interengaging teeth of said rotors, said case having means for recycling a part of burned gases for each rotor.

2. An engine in accordance with claim 1, comprising at least one fuel injector for each rotor and wherein said fuel injectors provide a number of combustions per revolutions of the rotors which is equal to the combined number of teeth of the two rotors.

3. An engine in accordance with claim 1, comprising a sealing wall located within said case, the inner surfaces of said case providing a complete seal relatively to said sealing wall, said rotors and said tooth tips.

4. An engine in accordance with claim 3, comprising springs pressing said sealing wall against said rotors.

5. An engine in accordance with claim 1, wherein said case has a separate inlet port on each side of each rotor, said inlet ports being directed toward the bases of the teeth of the respective rotors.

6. An engine in accordance with claim 1, wherein said fuel injector is directed to provide injection and combustion behind the head of a tooth relatively to the direction of rotation of said rotors.

7. An engine in accordance with claim 1, wherein said means comprise for each rotor a port located upstream relatively to said outlet port, a port located downstream relatively to said inlet port and a passage joining the two last-mentioned ports.

References Cited

UNITED STATES PATENTS

| | | | |
|---|---|---|---|
| 922,875 | 5/1909 | Fraser. | |
| 1,086,159 | 2/1914 | Goldberg. | |
| 1,656,538 | 1/1928 | Smith | 123—12 |
| 1,856,011 | 4/1932 | Woodward | 123—12 |
| 1,916,325 | 7/1933 | McAdams | 123—119 |
| 1,923,357 | 8/1933 | Doering | 123—119 |
| 1,975,619 | 10/1934 | Rector | 123—119 |
| 2,164,462 | 7/1939 | Lutschg | 123—12 |
| 2,988,065 | 6/1961 | Wankel et al. | 123—8 |
| 3,115,124 | 12/1963 | Huthmacher | 123—12 |

FOREIGN PATENTS

| | | |
|---|---|---|
| 583,035 | 10/1924 | France. |
| 1,314,527 | 12/1962 | France. |
| 124,284 | 3/1919 | Great Britain. |

MARK NEWMAN, *Primary Examiner*.

F. T. SADLER, *Assistant Examiner*.

UNITED STATES PATENT OFFICE
CERTIFICATE OF CORRECTION

Patent No. 3,323,499　　　　　　　　　　　　　　　　　　June 6, 1967

Peter Hendrik Gijbels

It is hereby certified that error appears in the above numbered patent requiring correction and that the said Letters Patent should read as corrected below.

In the heading to the printed specification, line 4, for "Peter Hendrik Gijbeis" read -- Peter Hendrik Gijbels --.

Signed and sealed this 2nd day of January 1968.

(SEAL)
Attest:

Edward M. Fletcher, Jr.　　　　　　　　　　　　　　EDWARD J. BRENNER
Attesting Officer　　　　　　　　　　　　　　　　　　Commissioner of Patents